2 Sheets—Sheet 1.
C. WHIPPLE.
Machine for Shaving Heads of Wood Screws.
No. 687. Reissued April 12, 1859.
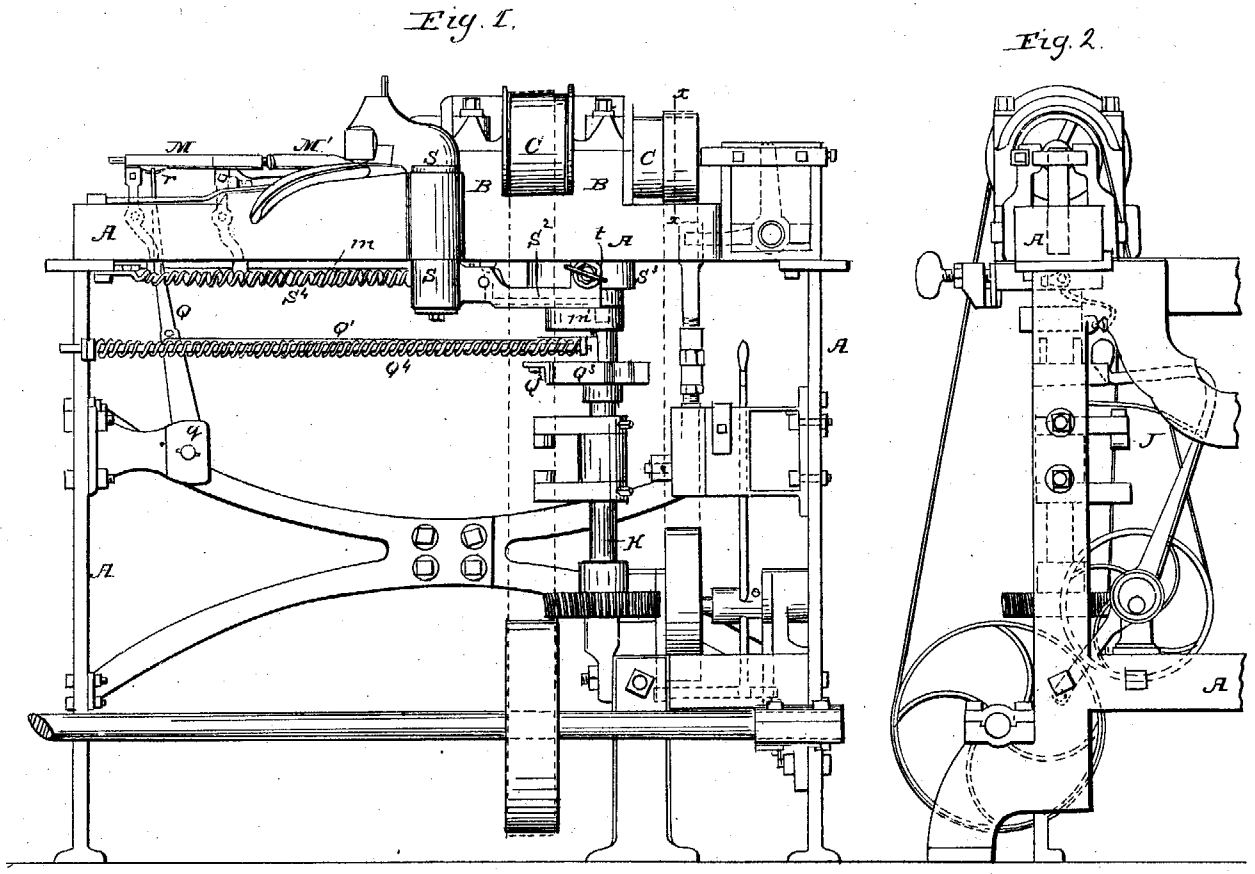
N. PETERS. Photo-Lithographer, Washington, D. C.

2 Sheets—Sheet 2.
C. WHIPPLE.
Machine for Shaving Heads of Wood Screws.
No. 687. Reissued April 12, 1859.
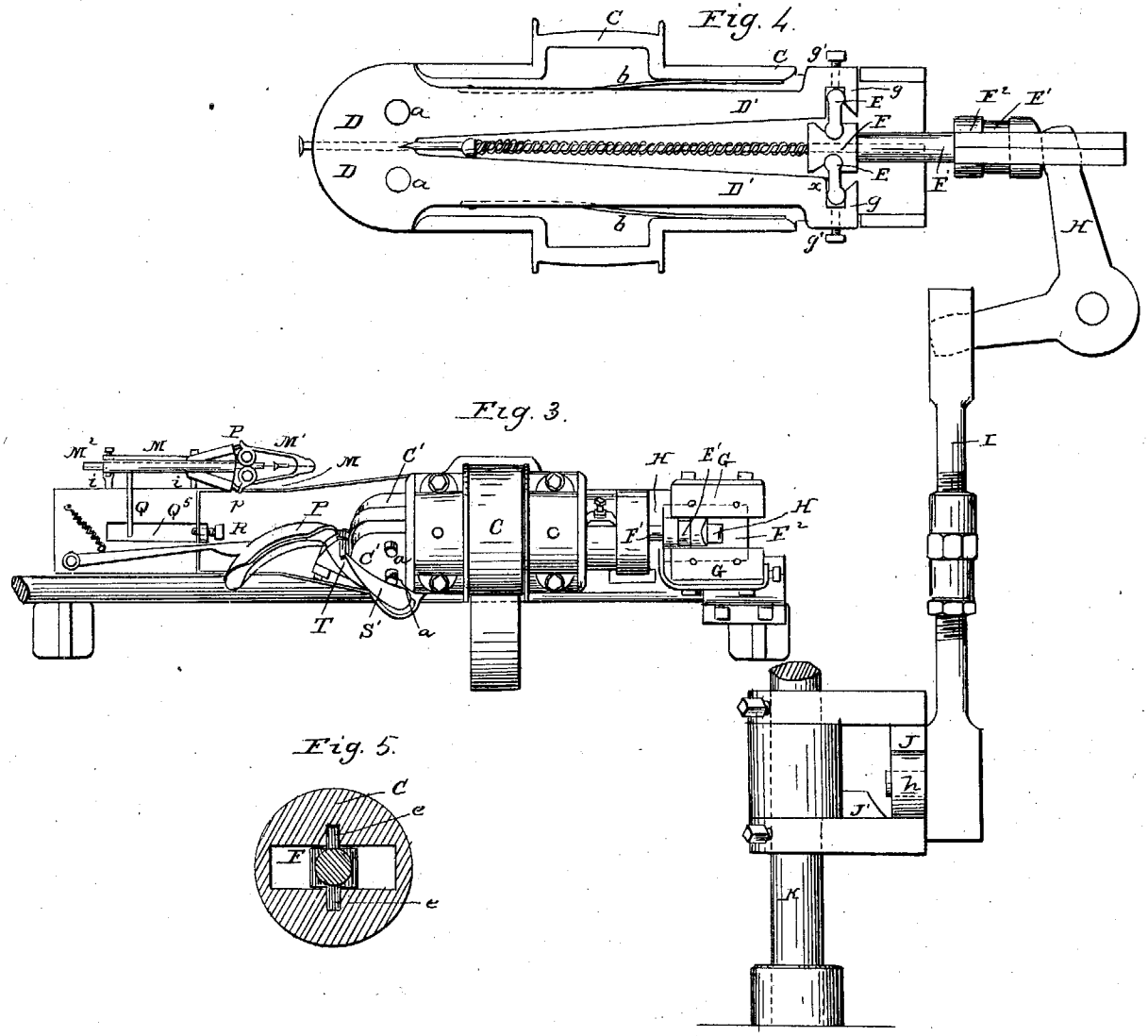
N. PETERS, Photo-Lithographer, Washington, D. C.

UNITED STATES PATENT OFFICE.

NEW ENGLAND SCREW COMPANY, OF PROVIDENCE, RHODE ISLAND, ASSIGNEE OF CULLEN WHIPPLE, OF SAME PLACE.

IMPROVED MACHINERY FOR MAKING WOOD-SCREWS, &c.

Specification forming part of Letters Patent No. 6,148, dated December 7, 1852; antedated June 7, 1852; Reissue No. 687, dated April 12, 1859.

*To all whom it may concern:*

Be it known that CULLEN WHIPPLE, of the city and county of Providence, in the State, of Rhode Island, has invented a new and useful Improvement in Machinery for the Manufacture of Wood-Screws, of which the following is a full, clear, and exact description, reference being had to the annexed drawings, which make part of this specification, and in which—

Figure 1 represents a side elevation, Fig. 2 an end elevation, and Fig. 3 a plan, of a machine for shaving the heads of wood-screws, (complete with the exception of the hopper and its adjuncts,) showing one application of said improvement. Fig. 4 represents on an enlarged scale the mandrel in section, together with an elevation of the mechanism connected therewith for holding and liberating and for discharging the blank; and Fig. 5 represents a transverse section through the rear of the mandrel at the line *x x* of Fig. 1.

The improvement which is the subject of this patent consists of a feeding-trough which receives the blank from a hopper and is traversed by an adjustable rod or punch to push the blank into gripping or chucking jaws on a revolving mandrel, to be by them grasped and held until operated on by a cutter, when it is released from the grasp of the jaws and then expelled by a spring discharging-punch carried by the mandrel.

The said improvement further consists of the said adjustable feeding-punch and the discharging-punch in combination with the said feeding-trough or the equivalent thereof; and the said improvement consists also in arranging the spring discharging-punch in the grooves of the gripping-jaws, so that when discharging the blank it will stop at a point a little within the outer end of the grooves to leave an opening at their entrance sufficient to admit and guide the end of the blank against the punch, thus avoiding the great liability of the blank to glance aside from the punch and groove and miss being chucked, to which it would be subject if the end of the blank came into contact with the end of the punch and had to press it backward before entering the groove.

The feeding-trough, formed of two parts, M′ M′, is carried, as shown in the drawings, on the end of a stock, M, mounted on arms *i i*, projecting upward from a rock-shaft, *m*. By means of a cam, *m*, on the revolving shaft K, acting upon another arm projecting from the rock-shaft *m* in concert with a reacting spring, the feeding-trough is, first, at the proper moment, carried to the side of the machine, where it receives an undressed blank from a hopper above, and thence is carried back with the blank to the middle of the machine in a line with the axis of the revolving mandrel C and chuck-jaws D D, where, by means of a feeding-punch, $M^2$, protruded from a socket in the stock M, now in the line of the axis of the revolving mandrel, the blank is pushed through an aperture in the end of the feeding-trough into the grooved space between the gripping-jaws, to be there firmly grasped and held until it is dressed. The feeding-punch is actuated by a lever, Q, pivoted at its lower end to a bracket, *q*, on the frame A, and taking at its upper end into a recess in a boss, *r*, projecting downward from the body of the punch through a slot in the under side of the stock M. This arrangement admits of the movement of the feeding-trough from side to side, as above described. The lever Q is connected near its middle to the front end of a horizontal rod, Q′, whose rear end is forked to embrace the shaft K, across which as a guide it slides back and forth. The rod Q′ is moved in one direction by a cam, $Q^3$, on the revolving shaft K, to vibrate the lever Q and draw the feeding-punch backward into its socket in the stock M after having fed a blank into the gripping-jaws. This cam bears on an arm, $Q^2$, projecting from the rod Q′, to move the latter backward and with it the feeding-punch; and the cam continues to bear against and hold the arm after the punch is retracted until the feeding-trough has brought another blank from the hopper into line with the axis of the mandrel, when the cam ceases to bear on the arm and releases the rod Q′, which is then drawn toward the gripping-jaws (carrying with it the lever Q, the feeding-punch, and the blank) by a spring, $Q^4$, acting upon the rod Q′ in a direction the reverse of that in which the cam *m′* acts thereon.

As the guide-aperture in the end of the feeding-trough must be made to bear on the shank or that part of the blank which first passes through, it is necessary in the case of blanks introduced with their points toward the mandrel that this end of the trough should be made capable of opening to allow the head of the blank to pass through the aperture. This object is attained by dividing the trough in a longitudinal and vertical direction into two sections or jaws, (as they may be called,) M′ M′. These are hinged to the stock M at *o o*, and are pressed together by spiral springs *p p*, inserted between an arm of each jaw and a corresponding projection of the stock. When the blank is pushed from the trough into the chuck, these jaws yield, to enlarge the aperture in the end of the trough and allow the head to pass through, when the jaws close again, and the trough is ready to hold another blank.

The devices carried by the mandrel for grasping or chucking the blank, holding it chucked until dressed, and then liberating it consist of a pair of nippers, D D, with their fulcrum-pins *a a* and long shanks D′ D′ and the toggle-levers E E, with their traversing hinge-block F, to extend and flex the toggles, to alternately close the jaws upon the blank, to grasp it, and to allow them to open and release the blank, and the holdfast or stops *x x*, to lock the toggles while holding the blank. As these parts and their functions are fully described in a patent granted to us of the same date as this, they need not be more minutely described here. When the blank is pushed by the feeding-punch into the grooves for its reception in the adjacent faces of the gripping-jaws D D, it encounters (after it has entered the grooves far enough to guide its end) a spring-punch, L, arranged to slide in the same grooves, which has to be forced back against the pressure of a spring by the blank as it advances. This spring is coiled around the punch, and so disposed as to tend constantly to press the punch outward, and, of course, to resist the entrance of the blank between the jaws. The blank is thus held tightly endwise between the discharging and the feeding punch, and the moment the latter has pushed the blank to the position required for the cutter to act upon it, as determined by the adjustment, the momentum of the blank is counteracted and its advance instantly arrested by the opposing action of the discharging-punch. Thus, however rapidly the blank is fed into the jaws, its momentum does not affect its position between them, as it would do if not thus fed against the resistance of the discharging-punch. This function, therefore, of the discharging-punch in the operation of chucking the blank to be dressed is nearly, if not quite, as important as that which it performs in the operation of discharging the dressed blank from the chuck. It is likewise of great importance to arrange the discharging-punch within the gripping-jaws in such manner that its end will not when in its most advanced position reach quite to the outer end of the grooves in the jaws, for if the end of the punch were flush with or projected beyond the face of the jaws, the end of the blank when pushed against it would be liable to glance off and miss the groove, all danger of which is entirely obviated by leaving the end of the punch slightly within the ends of the jaws.

The blank, when inserted in the chuck as described, is secured by the closing of the jaws upon it. The feeding-punch is then withdrawn into its socket and the trough is carried aside to receive another blank from the hopper. The cutter is then brought into contact with the blank, and when it has completed its operation it is withdrawn and the gripping-jaws are opened to release the blank, which is expelled therefrom by a sudden thrust of the spring discharging-punch, and enters a tube, P, which has in the mean time been brought before it, to receive and conduct it from the machine. The discharging-punch has a collar or stop formed on it in front of the spring. This stop, when the blank is discharged, is borne by the spring against the rear end or shoulder of the gripping-jaws, which limits the advance of the punch in the grooves when the blank is expelled. The rear end of the discharging-punch slides in a guiding-socket in the block F, supported in the rear part of the mandrel, against which block also the spring on the punch has its bearing in the rear.

Neither the hopper to contain the supply of undressed blanks nor the mechanism for delivering the blanks therefrom to the feeding-trough need be here described, as they form no part of the invention herein claimed.

The said improvement has been described as applicable to a machine specially adapted to shaving the heads of blanks; but it is evident that it may be applied to machines by which other operations in the manufacture of screws are effected. Thus, for example, the feeder may be adapted to receiving the blank with its head toward the gripping-jaws and the latter may be constructed to admit and grasp the head of the blank, thus holding it firmly while its shank is being dressed. In this case the peculiar advantage of operating the discharging-punch by a spring particularly appears, since it allows no time, as a positive motion might, after the screw is released and before it is discharged for its shank to drop down between the jaws and hang by the head, in which position it would obstruct the chucking of the next blank and endanger the breaking of the machinery by preventing the jaws from closing.

The mechanism for imparting motion to the several elements of the machine and for controlling their movements may likewise be varied. Thus, for example, the feeding-trough and its immediate adjuncts may have a longitudinal alternating movement instead of a lateral alternating movement, the hopper also in such case being adapted to this modification, which, with other modifications of the machine, can readily be carried into effect by skillful mechanicians if circumstances should render it expedient to make them.

What is claimed under this patent as the invention of the said CULLEN WHIPPLE, is—

1. The feeder composed of a sectional trough with a close bottom and open top, into which the blank drops and arranges itself before a traversing rod, which pushes it into the gripping-jaws, as described.

2. The combination of an adjustable automatic feeding-punch and a spring discharging-punch with an intermediate trough or equivalent means for bringing the blank into line with the two punches, substantially as herein set forth.

3. The arrangement of a spring discharging-punch with its end far enough within the end of the grooves in the gripping-jaws to leave an opening for admitting the end of blank and guiding it against the end of the discharging-punch, thereby rendering the chucking more certain, substantially as herein set forth.

In testimony whereof the said company has hereunto signed its name and affixed its seal.

NEW ENGLAND SCREW COMPANY, [L. S.]
By HENRY L. KENDALL,
*Agent.*

Witnesses:
P. H. WATSON,
HENRY BALDWIN, Jr.